Figure 1:
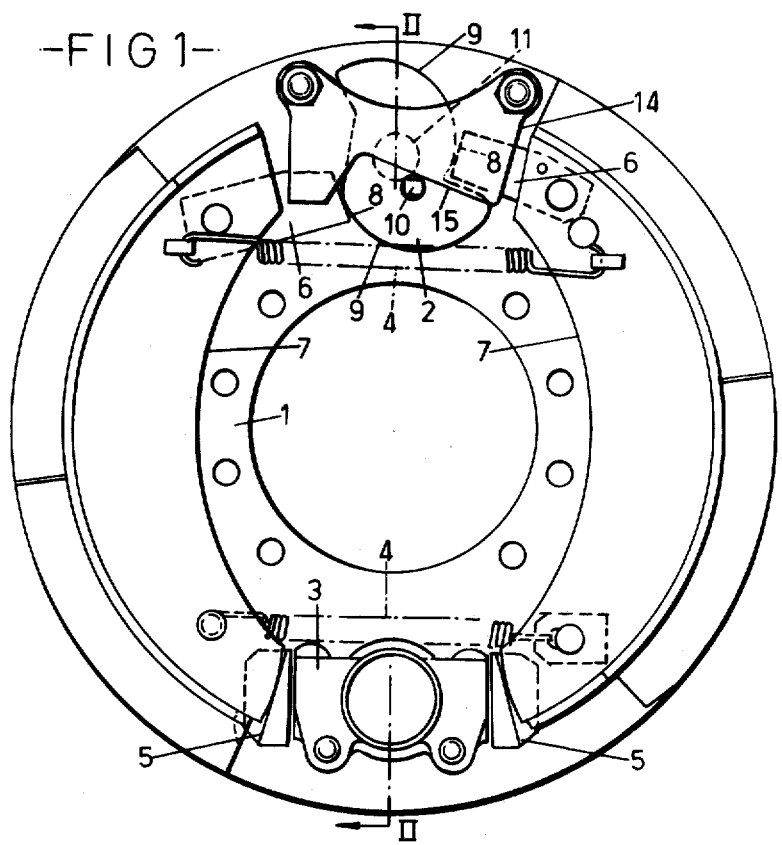

United States Patent
Newstead et al.

[15] 3,677,374
[45] July 18, 1972

[54] CAM ACTUATED DRUM BRAKE

[72] Inventors: Charles Newstead, Walsall; John Lesley Cullen, Stratford upon Avon; Michal Zajko, Coventry, all of England

[73] Assignee: Girling Limited, Birmingham, England

[22] Filed: June 2, 1970

[21] Appl. No.: 42,701

[30] Foreign Application Priority Data

June 25, 1969 Great Britain......................32,027/69
April 22, 1970 Great Britain......................19,228/70

[52] U.S. Cl............................188/329, 188/341, 192/75, 192/93
[51] Int. Cl............................................F16d 51/22
[58] Field of Search................188/329, 330, 341, 324, 327, 188/332, 338, 339; 192/75, 78, 93

[56] References Cited

UNITED STATES PATENTS

| | | | |
|---|---|---|---|
| 2,728,418 | 12/1955 | Dombeck | 188/329 |
| 2,186,321 | 1/1940 | Boldt et al. | 188/330 |
| 2,770,327 | 11/1956 | White | 188/332 |
| 3,106,991 | 10/1963 | Winge | 188/332 |
| 2,497,037 | 2/1970 | Deibel | 188/329 |

FOREIGN PATENTS OR APPLICATIONS

| | | | |
|---|---|---|---|
| 284,008 | 3/1931 | Italy | 188/329 |
| 753,012 | 7/1956 | Great Britain | 188/341 |

*Primary Examiner*—George E. A. Halvosa
*Attorney*—Scrivener, Parker, Scrivener and Clarke

[57] ABSTRACT

An S-cam drum brake, for example, has shoes each of which pivot at one end when the other ends are forced apart by means of the S-cam but in addition the one end can slide and/or tilt in at least one other mode of movement to provide more even wear and to cater for conicalness of the drum respectively. Shoe pull off springs cooperate with an abutment at said one end to provide a radial inward bias which is counteracted by the cam profile and the profile of a slipper on the shoe there abutting. The abutment is preferably an adjuster. A fixed or variable stop can be used to set a minimum rise position of the S-cam.

7 Claims, 3 Drawing Figures

Patented July 18, 1972

3,677,374

2 Sheets-Sheet 1

CAM ACTUATED DRUM BRAKE

The present invention concerns frictional coupling assemblies with particular application to shoe and actuating assemblies for drum type vehicle brakes.

It particularly relates to drum type brake assemblies with opposed brake shoes which are urged outwardly by a rotary cam disposed between two adjacent ends of the brake shoes. In the prior art, the other pair of adjacent ends are pivotted to a torque absorbing means. One brake of this type is the well-known Girling-Owen S-cam Brake.

An object of the present invention is to achieve more evenly distributed wear of the brake shoes over their area.

The present invention provides in one aspect thereof a frictional coupling assembly, for use in a vehicle drum brake, comprising a backing plate, opposed arcuate frictional shoes spaced from the backing plate but free to move relative thereto for at least a limited extent, a rotary cam mounted on the backing plate and disposed between two adjacent ends of the shoes to urge them outwardly on rotation of the cam, and torque absorbing means between the other adjacent end of the shoes, characterized in that said means allow not only the shoes to pivot in a plane parallel to the backing plate but also allow the shoes to move relative to the torque absorbing means in at least one other mode.

If said at least one other mode comprises a sliding mode permitting the other ends to slide on the torque absorbing means in a plane parallel to the backing plate, the shoes can exert a more constant pressure on a brake drum whereby they wear more evenly along their lengths. Also this sliding mode will allow the shoes to adjust for eccentricity of the brake drum.

The said other ends preferably abut radially inwardly converging faces on the torque absorbing means. Under the bias exerted by brake pull-off springs, said other ends will be biassed radially inwardly. This radially inward bias of said other ends if preferably counteracted by the engagement of the cam on slippers provided on said two adjacent ends being designed to urge said two adjacent ends radially inwardly.

A tilting mode wherein the shoes can pivot about axes parallel to the backing plate and through the ends of the shoes can be provided so that the shoes will adjust themselves to cater with conisticity (or conicalness) of the drum.

The cam geometry is preferably such as to give a constant cam rise with respect to angular displacement.

A stop can be provided to define an initial minimum rise position of the cam. This stop can be mounted on the backing plate or on the cam itself. The stop can be adjustable.

A cover plate can be carried from the backing plate and cooperate therewith to locate the cam axially between the two plates. An edge of this cover plate can cooperate with a stop on the cam to set the initial minimum rise position of the cam.

Embodiments of the invention will now be described by way of example, with reference to the accompanying drawings.

The drawings are

Figure 2:
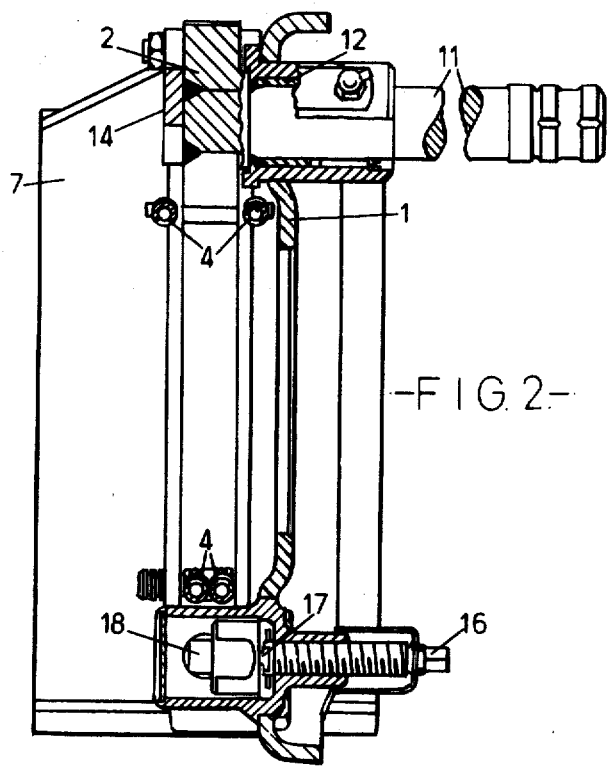

FIG. 1, a face view of a brake assembly with the brake drum removed for purpose of illustration;

FIG. 2, a cross-section on line II — II of FIG. 1; and

Figure 3:
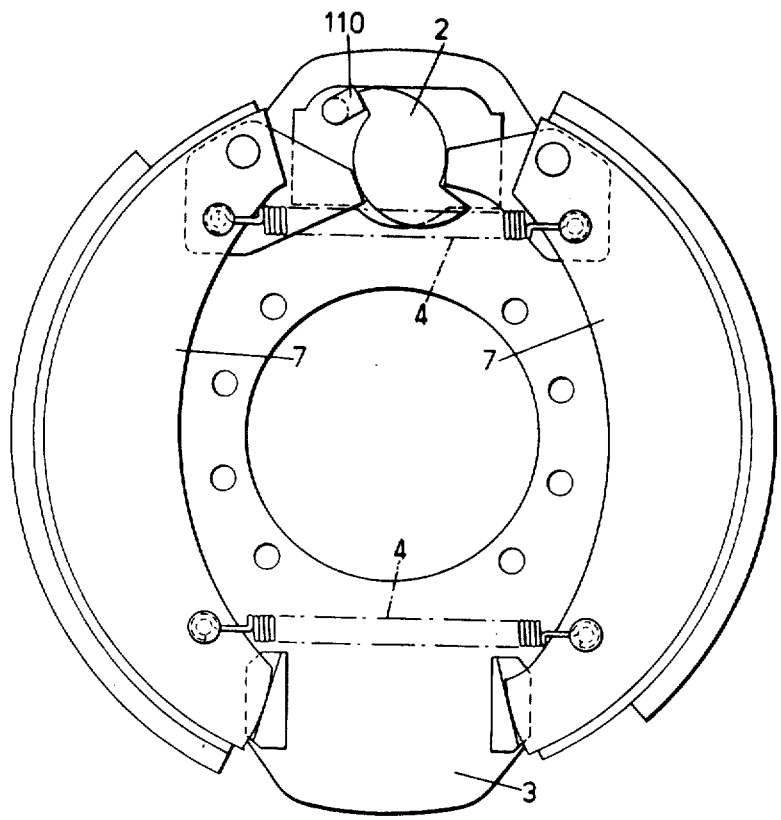

FIG. 3, a face view of a second brake assembly.

A DETAILED DESCRIPTION OF EMBODIMENTS

Mounted on a torque or backing plate 1 there is a shoe actuating means 2 and a diametrically opposite but cooperating torque absorbing means in the form of an adjuster 3. A pair of twin or single web brake shoes 7 is held, by means of pull-off springs 4, with two adjacent ends, one on each shoe, abutting the adjuster 3 and two adjacent ends, one on each shoe, abutting the actuating means. The brake shoes 7 can be loosely attached to the torque or backing plate by means of steady posts and hold-down springs if desired but the sole requirement is that they be held spaced from the backing plate but free to move relative thereto for at least a limited extent.

The torque absorbing means has inclined faces 5 against which the ends of the brake shoes abut, the faces being inclined so that the faces converge in the radially inward direction. One effect of the springs 4 is to bias the lower ends of the brake shoes upwardly by a wedge action so that when the brake is released, the ends of the brake shoes in contact with the faces 5 lift clear of the drum. The mode of movement permitting the shoes to slide in a plane parallel to the backing plate allows the shoes to exert a more evenly distributed pressure on a brake drum and so renders wear more evenly distributed along the lengths of the shoes. Moreover the shoes can yield to cater for eccentricity.

These faces are provided on the roots or floors of grooves in the ends of the torque absorbing means and the brake shoes can tilt or pivot slightly in these grooves about an axis parallel to the backing plate and this mode of movement copes with any conisticity of the brake drum.

The actuating means comprises a rotary cam of generally S-shape manufactured integrally with, bolted on to, or welded to, a shaft 11 which can be rotated by a mechanical or hydraulic brake linkage (not shown). The shaft is journalled in a nylon bush 12 in the backing plate. The rotary cam abuts slippers 6 attached to or integral with the brake shoes 7 at the ends neighboring the actuating means. These slippers have faces 8 which contact the cam. These faces 8 are each inclined to a diameter passing through the cam and the torque absorbing means by the same (or a similar) angle, which is about 15°, as a substantially diametrically opposite abutment face on the torque absorbing means and the faces 8 converge in the radially inward direction.

The cam is rotatable clockwise in FIG. 1. The geometry of the cam and the faces 8 is selected to give a suitable downward push on the shoes 7 to overcome the bias afforded by the wedging action of the faces 5 under the influence of the springs 4.

The rotary cam is designed with a mathematical involute function profile somewhat similar to the spiral of Archimedes to produce a relatively constant angle of attack similar to the angle given on the lower abutment surface. The cam has two lobes of this profile.

A limit stop 10 can be provided to prevent excessive reverse rotation of the actuating means and to facilitate initial setting-up of the brake shoe assembly.

In the embodiment of FIGS. 1 and 2 this is in the form of a stiffly rotatable cam in the actuating means 2. This cam cooperates with a cover plate 14 which has a cut away edge 15 cooperating with the stop 10 to allow full movement of the actuating means through its desired range of travel from a variable initial position. The cover plate in combination with the backing plate locates the actuating means axially.

The torque absorbing means can be a fixed stop or an automatic or manual adjuster. The illustrated form is a manual adjuster having a threaded, square-headed, shank 16 which cooperates with a thread in the backing plate to push on a wedge member 18 through a thrust bearing 17.

One of the advantages of the embodiment illustrated in FIGS. 1 and 2 with a manual adjuster and the precise shape of S-cam is that an adjustment of the adjuster can be left until about half of the brake lining has been worn away and the S-cam is at its maximum rise. At this time the S-cam would be reset to its initial position with the stop 10 abutting the cover plate. Then the adjuster would be set to take up the wear on the linings. The linings can be double the normal thickness.

FIG. 3 illustrates a simpler embodiment wherein the stop 110 is attached to the backing plate and a non-adjustable stop is used as the torque absorbing means. The stop 110 is screwed onto the backing plate and can be non-adjustable or adjusted slightly. The stop 110 as in the previous embodiment prevents excessive reverse rotation.

We claim:

1. A frictional coupling assembly for use in a vehicle drum brake, comprising a backing plate, opposed arcuate frictional shoes spaced from the backing plate but free to move relative thereto for at least a limited extent, pull-off springs connecting said shoes, a rotary cam mounted from the backing plate, having two oppositely acting identical lobes of involute form, and disposed between two adjacent ends of the shoes so that the lobes urge the ends outwardly on rotation of the cam, the ends of the shoes being inclined to that diameter of the assembly which passes through the center of the rotary cam in a radially inwardly converging manner, and torque absorbing means diametrically opposite to said S-Cam between the other adjacent ends of the shoes and having radially inwardly converging surfaces inclined to said diameter at substantially the same angle as the first-mentioned ends against which said other adjacent ends of the shoes slidably abut whereby said means allow the shoes not only to pivot in a plane parallel to the backing plate but also to slide in that plane to distribute wear of the shoes more evenly over their length and to cater for eccentricity and whereby the forces at each end of each shoe comprise a force due to the pull-off spring and a force between the shoe and the S-Cam at one end and the means at the other and result in a radially inward bias at each end tending to centralize the brake shoes when these are not urged apart.

2. A frictional coupling assembly as claimed in claim 1 wherein said two adjacent ends of the shoes are provided with slippers having said inclination whereby the shoes can be made as standardized components which are modified to have inclined ends by said slippers.

3. A frictional coupling assembly as claimed in claim 1 wherein said radially inwardly converging surfaces of the torque absorbing means are provided by the roots of slots in the torque absorbing means, the slots being sufficiently wide as to allow the shoes to tilt about an axis parallel to the backing plate to cater for conisticity.

4. A frictional coupling according to claim 1, wherein a stop is provided to set an initial minimum rise position of the cam.

5. A frictional coupling assembly according to claim 4 wherein said stop is mounted on the backing plate.

6. A frictional coupling assembly according to claim 5 wherein the stop is adjustable.

7. A frictional coupling assembly according to claim 6 comprising a cover plate carried from the backing plate and cooperating therewith to locate the cam axially between the two plates and wherein the adjustable stop is carried on the cam itself for abutment in said initial position with an edge of said cover plate.

* * * * *